United States Patent
Scigliuolo (10) Patent No.: US 6,520,174 B1
(45) Date of Patent: Feb. 18, 2003

(54) TWO STAGE FIRE CONTROL BARBECUE COOKING APPARATUS

(76) Inventor: Luigi Scigliuolo, 1718 Forest Cove Dr., Mount Prospect, IL (US) 60056

( * ) Notice: Subject to any disclaimer, the term of this patent is extended or adjusted under 35 U.S.C. 154(b) by 0 days.

(21) Appl. No.: 09/995,479

(22) Filed: Nov. 28, 2001

(51) Int. Cl.[7] ............................................. F24B 3/00
(52) U.S. Cl. ................ 126/25 R; 126/9 R; 126/51; 99/450
(58) Field of Search ................ 126/25 R, 9 R, 126/41 R, 39 J, 51; 99/445, 446, 447, 450, 400, 425, 444

(56) References Cited

U.S. PATENT DOCUMENTS

| | | |
|---|---|---|
| 3,191,591 A | 6/1965 | Bennett |
| 3,327,697 A | 6/1967 | Berlant |
| 3,385,282 A | 5/1968 | Lloyd |
| 3,424,145 A | 1/1969 | Stitt |
| 3,593,647 A | 7/1971 | Copeland |
| 4,703,746 A | 11/1987 | Hitch |
| 4,762,059 A * | 8/1988 | McLane, Sr. ............ 126/25 R |
| 4,763,639 A | 8/1988 | Goldsworthy |
| 4,969,449 A | 11/1990 | Levin |
| 5,121,676 A | 6/1992 | Jurgens |
| 5,211,105 A | 5/1993 | Liu |
| 5,279,277 A | 1/1994 | Barker |
| 5,553,601 A | 9/1996 | Parker |
| 5,911,812 A | 6/1999 | Stanek |
| 5,947,013 A * | 9/1999 | Stewart, Jr. ............ 126/25 R |
| D443,795 S | 6/2001 | Rimback |

* cited by examiner

Primary Examiner—James C. Yeung
(74) Attorney, Agent, or Firm—Meroni & Meroni, P.C.; Charles F. meroni, Jr.; Paul D. Pressley (57) ABSTRACT

The cooking apparatus comprises a collection plate and a cooking plate. The collection plate overlie the heat source of a barbecue grill having a center surface with semicircular cross section and a curved lip. The curved lip deflects gases being released by the heat source back toward the heat source reducing flames. Extruded apertures are provided through the center. The extrusions extend oppositely from the concavity of the center to direct a portion of the secretions onto the collection plate. A fluid retention channel is provided about the center. The outer surface of the inner retention wall retains secretions on the center of the collection plate. The cooking plate covers the barbecue grill fire chamber and has a plurality of apertures. The terminal end of a curved flange mates with the inner wall of the barbecue grill. A back stop member is connected to the top of the cooking plate.

23 Claims, 5 Drawing Sheets

TWO STAGE FIRE CONTROL BARBECUE COOKING APPARATUS

BACKGROUND OF THE INVENTION

1. Field of the Invention

The claimed invention relates generally to barbecue cooking grills, and in particular to two stage fire control cooking grills for barbecue cooking grills.

2. Description of the Prior Art

Charcoal barbecue grills normally employ a metal cooking grate disposed above a layer of burning charcoal. Placing meat products that produces significant amounts of fat drippings while cooking, such as beef and pork, on a typical cooking grate presents potential for fire flare ups as the fat drippings make contact with the burning coals. Although cooking these types of foods on a charcoal cooking grill provides numerous benefits such as smoked flavor and removing excess fat secretions from the food, the cooking of food over burning charcoal requires constant attention to prevent the fat drippings from exacerbating the charcoal into uncontrolled flames.

The intensification of the charcoal into uncontrolled flames presents potential problems such as burning the food being cooked or causing personal injury or property damage. This problem is particularly relevant when attempting to barbecue in a limited space, such as balconies in apartment buildings and condominiums. When barbecuing in these confined surroundings, special care has to be taken to minimize the height of the flames coming from the barbecue grill so that the surrounding structure does not become damaged.

Controlling the fat dripping from food being cooked over charcoal while still allowing the charcoal to impart the desired charcoal flavor onto the food is a difficult task to achieve. Two of the more common remedies for addressing fire flare ups created by fat drippings exacerbating the charcoal are simply moving the food to a different portion of the grate or spraying the flames with water. However, these are temporary remedies present other problems such as unevenly cooking the food and stirring up ash onto the food. To provide more effective remedies to the problem of charcoal flare up, the prior art presents several devices with different way of controlling the fat drippings from food being cooked over the charcoal.

U.S. Pat. No. 3,191,591 which issued to Bennett discloses a Charcoal Grill having a curved bottom 12 below an ordinary wire-mesh grill 22. The curved bottom has individual draining apertures 30 in indentations 26. The apertures 30 reduce the tendency for the grease drippings of meat to ignite flames on the curved bottom. However, grease drippings that fall directly on the charcoal still have a tendency to exacerbate the charcoal exciting the coals into flames. In like manner, U.S. Pat. No. 3,424,145 issued to Stitt discloses a Grill Liner having a noncombustible liner comprising a sheet-like body configured to the interior shape of a fire bowl and provided with radially extending corrugations defining upper and lower air passages extending inwardly from the peripheral edge of the liner completely thereabout. The liner is provided with apertures communicating the lower air passages with the top of the liner and hence combustible fuel supported thereon. The liner can be reinforced by a subjacent network of tin relatively rigid reinforcing wires. The upper rack is a conventional overhead rack, which appears to be a wire rack. Both of these prior art devices are used underneath the charcoal providing means for excess dripping to flow through to the bottom of the fire bowl. These devices reduce the amount of charcoal fire flare up, however, flare up is still a common occurrence with these device due to drippings falling directly on the charcoal and nearly instantaneously causing a flame to form. Therefore, there is a need for a device that will allow a portion of the drippings to fall onto the coals creating a more controlled amount of flame and having structure for preventing the fire from growing to an unmanageable size.

The barbecue grill of U.S. Pat. No. 4,703,746 issued to Hitch discloses a lower grate member and an upper grate member that generally have identical patterns of slots formed therethrough with generally identical patterns of bars delimiting the slots. The upper grate is slidable with respect to the lower grate such that the slots may be in complete registry to allow full heat transmission therethrough or the bars of the upper grate may be disposed to overlie the slots of the lower grate to prevent flare-ups. A drawback of this device is that the lower and upper grates not only prevent flames from coming through the grate system, but they also prevent the desired charcoal smoke from reaching the food placed upon the upper grate. Accordingly, a compromise has to be reached with devices of this type in that a certain amount of flame has to be allowed through the grate opening so that smoke will also be allowed through to contact the food. Therefore, this device does not fill the need for a device that will allow a portion of the drippings to fall onto the coals creating a more controlled amount of flame and having structure for preventing the fire from growing to an unmanageable size.

U.S. Pat. Nos. 4,763,639 and 4,969,449 disclose disposable covers for the upper grill member of a barbecue grill. The covers are made from a manually formable material having a plurality of perforations or holes therein for directing the quantity and flow of air beneath the cover when the cover is placed onto the cooking surface of the grill. These two covers collect the fat drippings from cooked foods on top of the cover surfaces. This makes these prior art devices undesirable for several reasons with the more notable one being the collection of the fat drippings on top of the cover makes the food cook in a pool of fat drippings gathered by the cover. This is undesirable in that the food being cooked retains much of the otherwise excess fat drippings when the food is bathed in its own fat secretions. A second undesirable aspect of using covers of this sort is that once a fire is created by the fat drippings that do fall through the perforations of the covers, the covers do not provide means for minimizing the flames. In fact, these covers provide an obstacle for a person attending the fire who wishes to douse the fire with water. Therefore, these covers do not address the problem of minimizing or elevating fire flare ups that may occur.

U.S. Pat. No. 5,211,105 discloses a grill pan comprising a food plate, an oil pan placed under the food plate, and a lower pan placed under the oil pan for burning a fire to heat the oil pan and the air in a hollow space between the oil pan and the food plate, the oil pan having a bottom corrugated with a plurality of holes for heated air to flow through and two opposite recesses near a circumferential edge. The food plate is also corrugated and has a plurality of holes for oil coming out of food placed on the food plate to flow through down to drop on to the oil pan and then flow into the two opposite recesses of the oil pan. This type of device is adapted for the frying of food over a heating source such as charcoal and is not designed to allow the smoke from the fire to barbecue the food. The device does provide structure to capture the oil and fat drippings from the food, but does so in such a way that it restricts a major portion of the charcoal effect from reaching the food being cooked. Therefore, this device is not capable of achieving the desired effect of barbecuing the food with the smoky flavor of charcoal while still preventing fire flare ups to occur due to fat drippings coming into contact with burning charcoal.

FIGS. 5 and 7 of U.S. Pat. No. 5,553,601 discloses parallel plates in a smoker assembly of a barbecue. The parallel plates have offset aperture patterns that facilitate the transfer of heat while preventing the accumulation of liquids from any food in a combustion chamber. The parallel plate are flat allowing accumulated fat drippings on the surface of the bottom plate to flow through the holes of the bottom plate thereby providing a source of aggravation to the fire below the bottom plate. This device catches a portion of the liquids coming from food being cooked, but allows a majority of the liquids to ultimately fall on the fire below. Accordingly, this type of device does not significantly reduce flare ups when food secreting large amount of fat drippings are cooked. Therefore, there is a need for a device that is capable of collecting a larger amount of liquids dripping from the cooking surface so that many different kinds of food can be barbecued without the problem of dealing with a volatile fire.

Finally, U.S. Pat. No. 5,911,812 discloses a cooking grille having elongated slots, rather than circular holes, for receiving heat from a barbecue below, and for directing fluids, such as fats, sauces, and meat juices. The cooking grille is placed upon and attached to a second collecting grille adapted for receiving the cooking grille in sliding engagement in a spaced apart relationship. The collection grille provides conducting channels which are formed at an angle with the horizontal for moving fluids laterally for collection and for avoiding contact with hot portions of the cooking equipment. However, those fluids that fall directly into the fire are free to start a fire flare up. Therefore, there is a need for a device that minimizes fires created by fluids such as fat drippings falling on the burning charcoal.

SUMMARY OF THE INVENTION

Accordingly, it is an object of the claimed invention to provide a device that reduces the amount of flames created by the heat source of a barbecue grill.

Another object of the claimed invention is to provide a device that collects a portion of the liquids dropped toward the heat source of a barbecue grill.

Yet another object of the claimed invention is to provide a device having structure to hold water so as to provide a source of moist heat during the cooking of food on a barbecue grill.

A further object of the claimed invention is to provide a backstop for the cooking surface to assist the acquisition of an item onto a utensil being used to turn an item over on a barbecue grill.

Still a further object of the claimed invention is to provide a device that makes it more safe to barbecue in confined areas such as balconies of apartment buildings and condominiums.

The claimed invention reduces the height and amount of flames created by a barbecue grill by performing two different tasks. First, the two stage fire control barbecue cooking apparatus collects a portion of the secretions from food that is being cooked on the barbecue grill before the secretions reach the heat source of the grill. This reduces the amount of flames created by the barbecue grill because the apparatus collects potentially flammable secretions before they provide fuel for the heat source of the grill. Second, the flames are reduced by redirecting the smoke from the fire back toward the fire in two different stages, thus reducing the oxygen available to the fire. The reduction of oxygen available to the heat source reduces the potential for the heat source flaming out of control.

With the foregoing objects and explanation in mind, a two stage fire control barbecue cooking apparatus is provided. The cooking apparatus comprises a collection plate and a cooking plate with back stop. In one embodiment of the invention, the collection plate is sized and shaped such that it rests against the inside walls of the fire bowl of a barbecue grill, just above the heat source, and the cooking plate is held in place over the collection plate by the grate holding means of the barbecue grill. In an alternate embodiment of the invention, the collection plate is suspended above the heat source of the barbecue grill by a plurality of hanging members extending from the bottom side of the cooking plate. In this alternate embodiment, a plurality of hanging members receiving apertures are provided through the collection plate so that the hanging members extend through the receiving apertures suspending the collection plate on the hanging members.

The collection plate is made of material that is sized and shaped to overlie the heat source of a barbecue grill having a center surface with semicircular cross section and a curved lip portion about the center surface. The curved lip portion has a greater radius than the semicircular cross section so that it deflects gases being released by the heat source back toward the heat source reducing flames created by the heat source. A plurality of extruded apertures are provided through the center surface of the collection plate. The extrusion portions of the extruded apertures extend oppositely from the concavity of the center surface so that they direct a portion of the secretions onto the surface of the collection plate. The extruded apertures allow gases and flames from the heat source to pass through the collection plate. The semicircular cross section of the collection plate guides secretions from food being cooked to the perimeter of the collection plate.

A fluid retention channel is provided about the center surface of the collection plate. The fluid retention channel walls extend above the surface of the collection plate and oppositely from the concavity of the collection plate. The outer surface of the inner retention wall retaining the secretions on the center surface of the collection plate.

The cooking plate has a top side, a bottom side, and a center portion bounded by a periphery portion, the cooking plate having size and shape to substantially cover the mouth of a barbecue grill fire bowl, the periphery portion engaging grate holding members of a barbecue grill. The cooking plate has a plurality of apertures through the center portion that are larger than the extruded apertures in the collection plate. A curved flange has a proximal end connected to the bottom side of the cooking plate that encircles the center portion of the cooking plate. The terminal end of the curved flange is configured to be in mating relationship with the inner wall of the barbecue grill so that it directs gases released by the heat source back toward the heat source so as to reduce flames from the heat source. As a useful addition to the device, a back stop member is connected to the top side of the cooking plate that extends substantially perpendicularly from the flat center surface.

BRIEF DESCRIPTION OF THE DRAWINGS

FIG. 1.

FIG. 2.

FIG. 3.

FIG. 4.

FIG. 5.

FIG. 6.

FIG. 7.

FIG. 8.

FIG. 9.

FIG. 10.

FIG. 11.

FIG. 12.

DETAILED DESCRIPTION OF THE PREFERRED EMBODIMENT

Figure 1:
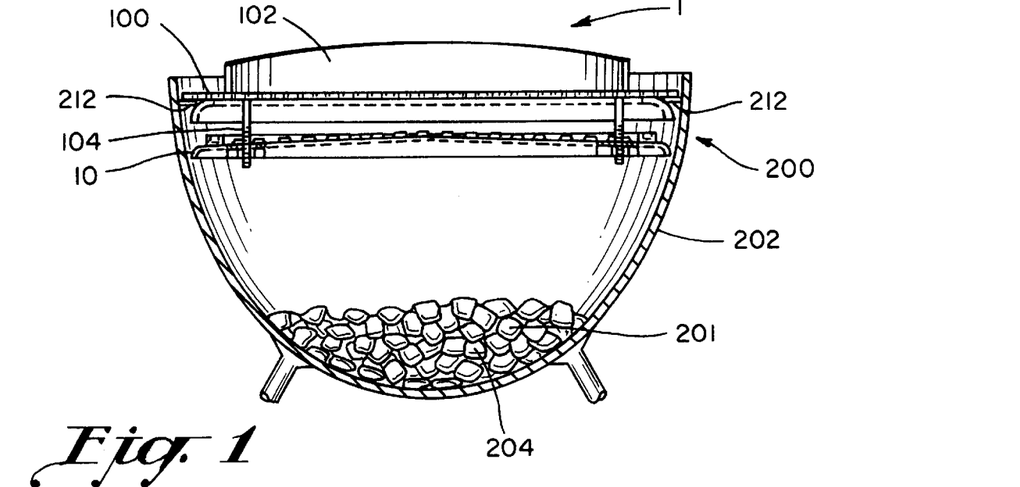
FIG. 1 illustrates a cross sectional view of the claimed invention and a fire bowl of a barbecue grill.
Figure 11:
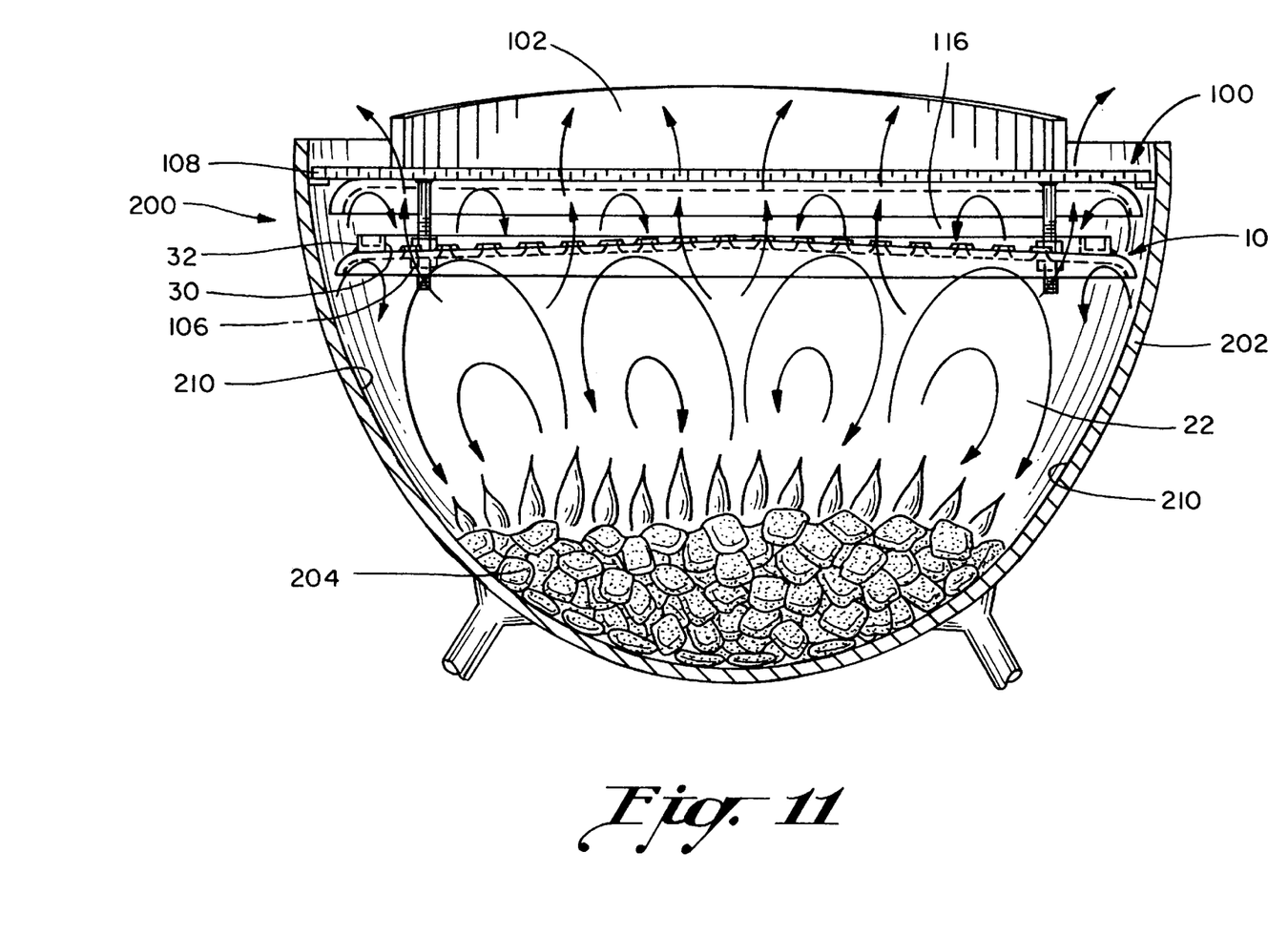
FIG. 11 illustrates the operation of the claimed invention.

Referring to the drawings, FIGS. 1 and 11 show the two stage fire control barbecue cooking apparatus 1 as it is used with a barbecue grill 200. The apparatus 1 has several different applications with one of the more important ones being use with barbecue grills in locations where the flames from the grill should be controlled from flaring several feet into the air. The apparatus 1 suppresses the height of the flames from the barbecue grill 200 so that the grill may be more safely used in confined spaces such as balconies of apartment buildings or condominiums. The apparatus 1 may also be used in other applications where controlling the height of the flames is important in the cooking of different kinds of food, such as in instances where foods that are easily burned are cooked along side other foods that drop flammable fat drippings onto the fire of the barbecue grill 200 causing flare ups and presenting problems for the proper cooking of easily burned foods.

The apparatus 1 reduces the height and amount of flames created by the barbecue grill 200 by performing two different tasks. First, the apparatus 1 collects a portion of the secretions 214 from food that is being cooked on the barbecue grill 200 before the secretions 214 reach the heat source 201 of the grill 200. See FIG. 12. This reduces the amount of flames created by the barbecue grill 200 because the apparatus 1 collects potentially flammable secretions 214 before they provide fuel for the heat source 201. Second, the fire is reduced by redirecting the smoke from the fire back toward the fire in two stages, thus reducing the oxygen available to the fire. See FIG. 11.

The cooking apparatus 1 as shown in FIGS. 2–10 comprises a collection plate 10 and a cooking plate 100 with backstop 102 and curved flange 112. In one embodiment of the invention, the collection plate 10 is sized and shaped such that it rests against the inside walls of the fire chamber or fire bowl 202, hereinafter fire bowl 202, of a barbecue grill 200, just above the heat source 201, and the cooking plate 100 is held in place over the collection plate 10 by the grate holding hooks 212 of the barbecue grill 200. This embodiment is primarily used on barbecue grills 200 with a kettle shaped fire bowl 202. The collection plate 10 is generally smaller in size in this embodiment than the cooking plate 100 to account for the curvature of the fire bowl 202 walls.

The collection plate 10 can also be used individually during the starting of a charcoal fire to suppress high reaching flames caused by excessive use of charcoal starter fluid. When an excess amount of charcoal starter fluid is placed on charcoal 204 for the initial ignition of the fire, large flames can be generated due to an over abundance of accelerant being present. The collection plate 10 can dampen the flames by dropping the collection plate 10 into the fire bowl 202 over the charcoal heat source 201 effectively reducing the amount of oxygen available to the fire.

Figure 12:
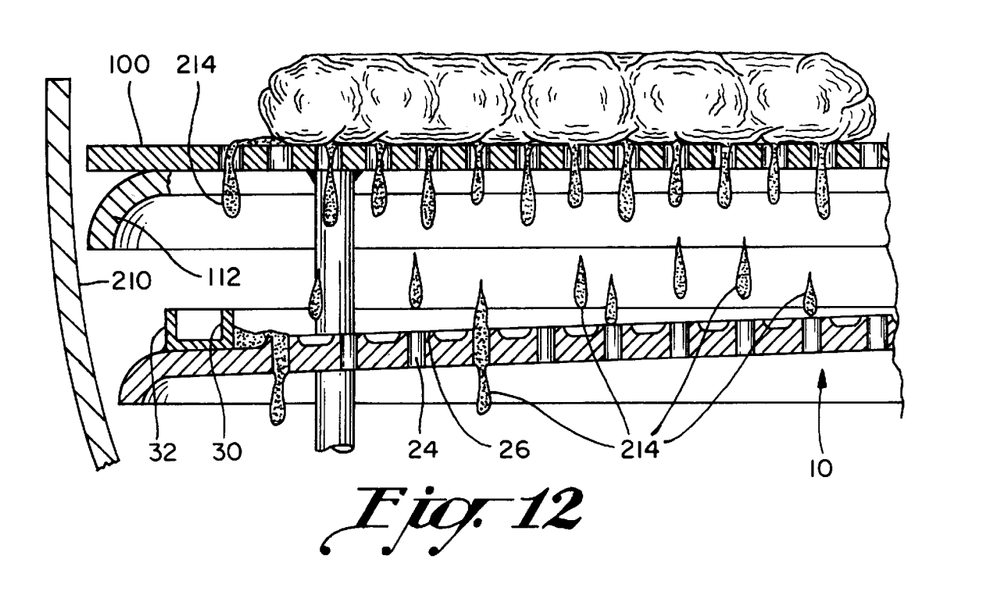
FIG. 12 illustrates how the claimed invention retains fluids from food.

FIGS. 1, 11, and 12 show another embodiment of the invention where the collection plate 10 is suspended above the heat source 201 of the barbecue grill 200 by a plurality of hanging members 104 extending from the bottom side of the cooking plate 100. In this embodiment, a plurality of hanging members 104 receiving apertures 106 are provided through the collection plate 10 so that the hanging members 104 extend through the receiving apertures 106 suspending the collection plate 10 on the hanging members 104. This embodiment of the invention may be used in different types of barbecue grills 200 where the fire bowl 202 does not have structure to support the collection plate 10 above the heat source 201 of the barbecue grill 200.

Figures 2, 3, 4:
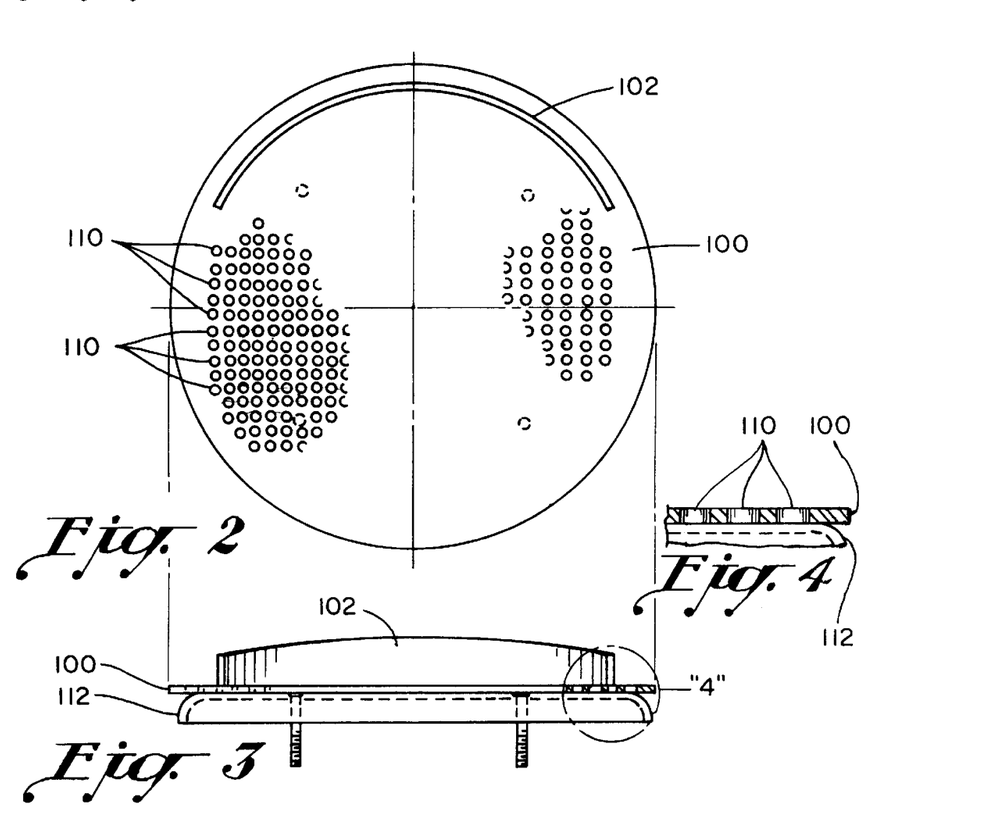
FIG. 2 illustrates a top view of the cooking plate of the claimed invention.
FIG. 3 illustrates a cross sectional view of the cooking plate.
FIG. 4 illustrates an enlarged view of the apertures through the cooking plate.
Figure 5:
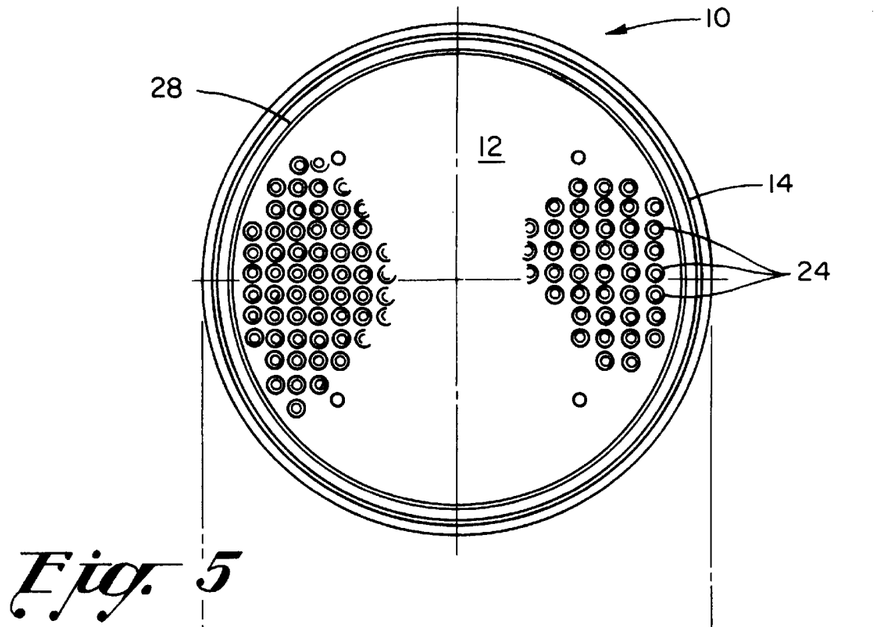
FIG. 5 illustrates a top view of the collection plate of the claimed invention.
Figure 6:
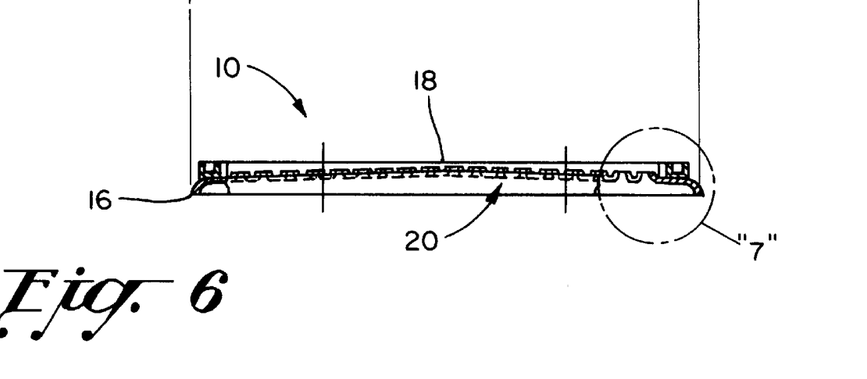
FIG. 6 illustrates a cross sectional view of the collection plate.
Figure 10:
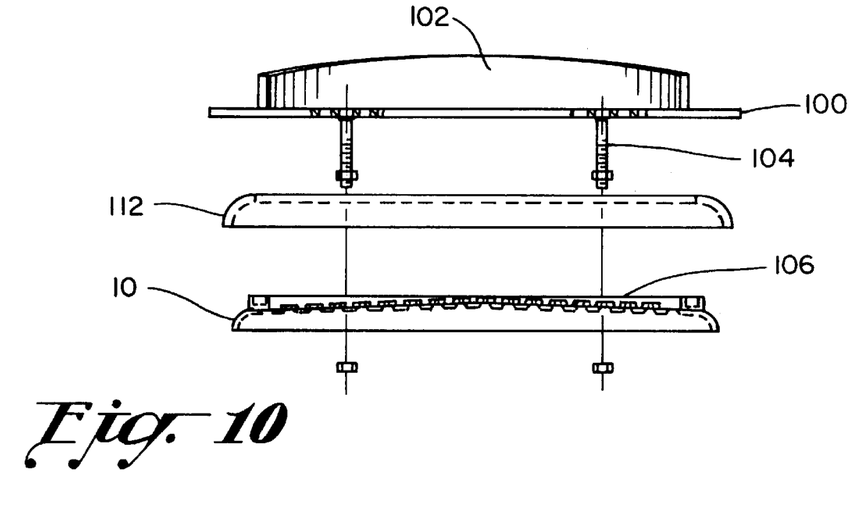
FIG. 10 illustrates an exploded view of the claimed invention.

The collection plate 10 in FIGS. 2, 3, and 10 is sized and shaped to overlie the heat source 201 of a barbecue grill 200 between the heat source 201 of the grill 200 and the grate 208 that the food is cooked upon. The collection plate 10 is preferably made of steel coated with material that is conducive to intense heat environments and is resistant to rust, such as chrome plating. The collection plate 10 has a center portion 12 with semicircular cross section with a radius of from about ⅛ to about ⅜ of an inch. The center portion 12 of the collection plate 10 is bounded by a curved lip portion 14 having a larger radius than that of the center portion 12 such that the over all distance from the distal edge 16 of the curved lip 14 to the peak 18 of the semicircular cross section 20 can be as little as about 2 inches to as much as about 6 inches.

FIGS. 1 and 11 show the area bounded by the collection plate 10, grill walls 210, and heat source 201 defines a first chamber 22. The concavity of the collection plate 10 provides a dome like structure where a portion of the smoke created by the heat source 201 is redirected within the first chamber 22 downwardly toward the heat source 201. The curved lip portion 14 has a greater radius than the semicircular cross section 20 so that as the smoke rises from the heat source 201 and fills the first chamber 22 the smoke near the walls 210 are sharply deflected toward the center portion 12 of the collection plate 10 where the semicircular cross section 20 of the center surface causes the smoke to rotate downwardly toward the heat source 201. Since smoke generally contains less oxygen than air, the amount of oxygen present in the first chamber 22 is reduced by the presence of an increased amount of smoke, correspondingly reducing the amount of flames produced by the heat source 201.

Figure 7:
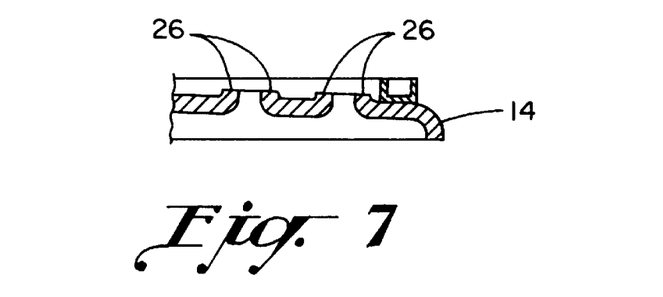
FIG. 7 illustrates an enlarged view of the apertures through the collection plate.

FIGS. 7, 11 and 12 show a plurality of extruded apertures 24 are provided through the center surface of the collection plate 10 allowing a reduced amount of smoke and flames from the heat source 201 to pass through the collection plate 10 to the food being cooked on the cooking plate 100 as shown in FIG. 11. The apertures 24 are preferably round in shape and are from about ⅛ inch to about ⅜ inch in diameter. The extrusion portions 26 of the extruded apertures 24 extend oppositely from the concavity of the center portion 12, performing two separate functions as shown in FIG. 12. First, the extrusions 26 act to catch a portion of the secretions 214 from food being cooked on the barbecue grill 200. The secretions 214 caught by the extrusions are then collected on the surface of the collection plate 10 and guided by the curvature of the center portion 12 toward the perimeter of the collection plate 10. It is also contemplated within the spirit of this invention that the collection plate 10 could be formed of other types of fire resistant materials such as certain kinds of plastics. Collection plates 10 of this type are designed with a protruded lip portion to replace the extrusion 26.

Secondly, the extrusions 26 prevent the secretions 214 that are being guided to the perimeter of the collection plate 10 from falling through other apertures 24 of the collection plate 10 between the point where the secretion makes contact with the collection plate 10 and the perimeter of the collection plate 10. See FIG. 12. The semicircular cross section 20 and extrusion features are an improvement over the prior art in that previous structures used to collect secretions 214 were flat and do not provide for the collection of secretions 214. Further, the secretions 214 that were caught by such structures were not contained on the structure, but were allowed to fall toward the heat source 201. In contrast, the claimed invention provides structure that guides the secretions 214 away from the center of the collection plate 10 allowing more secretions 214 to be captured. This in combination with the extrusion 26 features of the apertures 24 provide an effective device to collect secretions 214 from food being cooked on a barbecue grill 200 utilizing the claimed invention.

A fluid retention channel 30 is provided about the center portion 12 of the collection plate 10 as shown in FIGS. 11 and 12. The fluid retention channel 30 is generally positioned at the point where the semicircular cross section 20 of the center portion 12 meets the curved lip portion 14 and has walls 30, 32 that extend above the surface of the collection plate 10 and oppositely from the concavity of the collection plate 10. The fluid retention channel 30 serves two purposes as shown in FIG. 12. First, the channel itself provides structure to hold an amount of water that can be useful in situations where the food being cooked on the barbecue grill 200 requires moist heat to have a desirable outcome. Second, the outer surface of the inner retention wall 30 also acts as a retention wall for the secretions 214 draining toward the perimeter of the collection plate 10. This prevents the secretions 214 that are collected by the collection plate 10 from running off the collection plate 10 and exacerbating the heat source 201 into large amounts of flames.

FIGS. 2–4 show the cooking plate 100 of the claimed invention. The cooking plate 100 is preferably used in replacement of the conventional grate that typically accompanies a barbecue grill 200 when initially purchased. The cooking plate 100 is preferably made of steel coated with a material that is conducive to barbecuing such as chrome plating or non-stick coatings such as TEFLON, but may also be made of stainless steel. The grate 208 portion of the cooking plate 100 is sized and shaped to substantially cover the mouth of a barbecue grill fire bowl 202. FIGS. 1, 3, 10–12 illustrate the grate 208 of the cooking plate 100 is substantially flat to provide a suitable surface for barbecuing foods upon and has hook receiving apertures 108 near the periphery to engage grate holding hooks 212 of a conventional charcoal fired barbecue grill 200, preferably apertures through the cooking plate 100 sized and shaped to received the grate holding hooks 212.

FIGS. 2 and 4 show the cooking plate 100 has a plurality of apertures 110 through the center portion 12 of the grate 208 that are preferably circular in shape and are from about ¼ to about a ½ inch in diameter. The apertures 110 are preferably larger than the extruded apertures 24 in the collection plate 10 so as to facilitate the passing of liquids and gases through the grate 208 portion of the cooking plate 100 as well as facilitating the capture of liquids upon the collection plate 10. It is not necessary to align the hole pattern in the collection plate 10 with the hole pattern in the cooking plate 100 such that they are in registry with one another for the apparatus 1 to work properly. However, where holes in the cooking plate 100 are in registry with holes in collection plate 10, the larger hole of the cooking plate 100 facilitates the dripping of liquids from the cooking plate 100 onto the extrusion portion 26 of the collection plate 10 so that a portion of the liquid will be collected by the collection plate 10 and a portion of the liquid will be allowed to pass through the collection plate 10 to the heat source 201.

Figure 8:
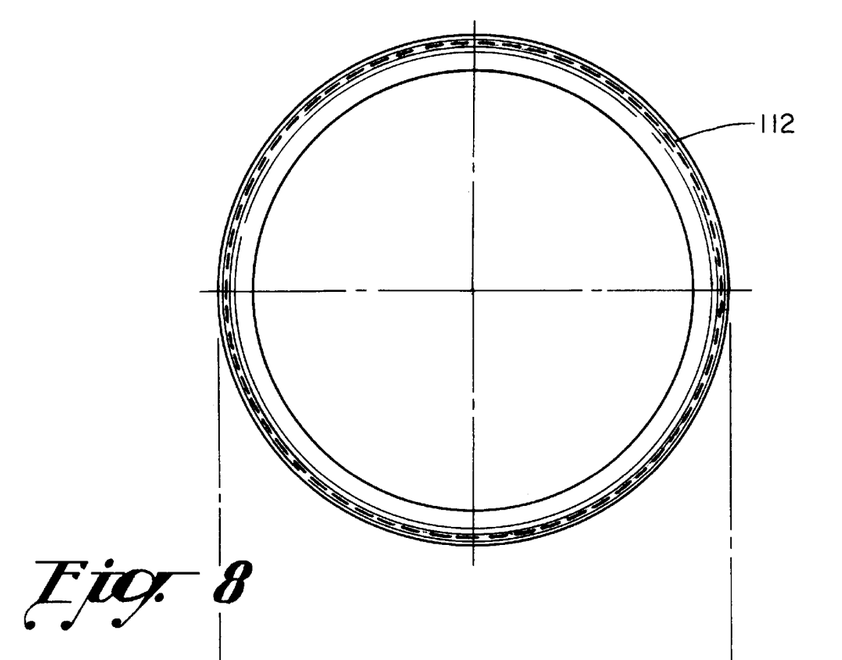
FIG. 8 illustrates a top view of the curved flange of the claimed invention.
Figure 9:
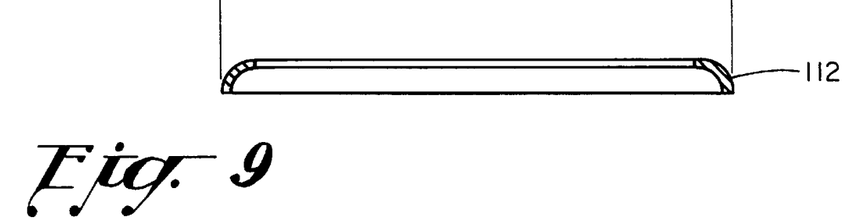
FIG. 9 illustrates a cross sectional view of the curved flange.

FIGS. 8–10 show a curved flange 112 is connected to the bottom side of the cooking plate 100 and encircles the center portion 12 of the cooking plate 100. The curved flange 112 is preferably made of similar materials and is configured such that terminal end 114 of the curved flange 112 will be in mating relationship with the inner side of the wall 210 of the barbecue grill 200 when the cooking plate 100 is placed on the barbecue grill 200. The area bounded by the bottom surface of the cooking plate 100, curved flange 112, grill walls 210, and top surface of the collection plate 10 form a second chamber 116 as shown in FIG. 11. Smoke passing through the collection plate 10 travels vertically toward the open mouth of the fire bowl 202. A portion of that smoke is redirected by the curved flange 112 and the bottom surface of the grate 208, filling the volume of the second chamber 116.

As the smoke fills the second chamber 116, the amount of oxygen within the second chamber 116 is reduced, further reducing the amount of oxygen available to the heat source 201. FIG. 11 shows how the first chamber 22 and second chamber 116 work together to reduce the amount of oxygen available to the heat source 201 while allowing an amount of the flames and smoke from the heat source 201 to come into contact with the food being cooked so as to effectively impart a barbecued flavor onto the food.

A backstop 102 member, preferably made of similar materials is connected to the perimeter of the top side of the cooking plate 100, extending substantially perpendicularly from the grate 208 portion of the cooking plate 100. FIG. 1–3 show the backstop 102 circumscribes approximately ⅓ of the outer perimeter of the cooking plate 100 and has height that facilitates the placement of a barbecue grill cover over the mouth of the fire bowl 202 without interfering with the seating of the cover onto the rim of the fire bowl 202. The backstop 102 facilitates the acquisition of food being grilled onto utensils so they may be turned, moved, or removed from the grill.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A two stage fire control barbecue cooking apparatus, the apparatus comprising:

a collection plate sized and shaped to overlie the heat source of a barbecue grill having a center surface of semicircular cross section forming a concave side and a curved lip portion about the center surface having a greater radius than the semicircular cross section, the lip portion deflecting gases being released by the heat source back toward the heat source reducing flames created by the heat source;

a plurality of extruded apertures having extrusion portions through the center surface of the collection plate, the extrusion portions extending oppositely from the concave side of the center surface directing a portion of food secretions onto the collection plate, the extruded apertures allowing gases and flames from the heat source to pass through the collection plate, the semicircular cross section guiding and collecting the secretions that fall onto the collection plate;

a fluid retention channel having a first fluid retention wall and a second retention wall about the center surface of the collection plate, the first and second fluid retention walls extending above the center surface of the collection plate and oppositely from the concave side of the center surface, the outer surface of the first fluid retention wall retaining the secretions on the center surface of the collection plate;

a cooking plate having a top side, a bottom side, and a center portion bounded by a periphery portion, the cooking plate having size and shape to substantially cover the mouth of a barbecue grill fire chamber, the periphery portion sized and shaped to engage grate holding members of a barbecue grill;

a plurality of apertures through the center portion of the cooking plate, the apertures having size larger than the extruded apertures in the collection plate;

a curved flange having a proximal end and a terminal end, the proximal end connected to the bottom side of the cooking plate encircling the center portion of the cooking plate, the terminal end configured to be in mating relationship with the inner wall of a barbecue grill directing gases released by the heat source back toward the heat source reducing flames from the heat source; and a back stop member connected to the top side of the cooking plate extending substantially perpendicularly from the center portion.

2. The apparatus of claim 1 further comprising:
a plurality of hanging members extending from the bottom side of the cooking plate;
a plurality of hanging members receiving apertures through the collection plate, the collection plate suspended by the hanging members over the heat source.

3. The apparatus of claim 2 wherein the hanging members are sized to make a 2 inch to 6 inch gap between the cooking plate and the collection plate.

4. The apparatus of claim 3 wherein the semicircular cross section of the collection plate has a radius of from about ⅛ of an inch to about ⅜ of an inch.

5. The apparatus of claim 4 wherein the plurality of extruded apertures are circular and are from about ⅛ inch to about ⅜ inch in diameter.

6. The apparatus of claim 5 wherein the plurality of apertures through the cooking plate are circular and are from about ¼ inch to about ½ inch in diameter.

7. The apparatus of claim 6 wherein the curved flange has a radius of from about 2 inches to about a 4 inches.

8. A two stage fire control barbecue cooking apparatus, the apparatus comprising:
a collection plate sized and shaped to overlie the heat source of a barbecue grill having a center surface of semicircular cross section forming a concave side and a curved lip portion about the center surface having a greater radius than the semicircular cross section, the lip portion deflecting gases being released by the heat source back toward the heat source reducing flames created by the heat source;

a plurality of extruded apertures having extrusion portions through the center surface of the collection plate, the extrusion portions extending oppositely from the concave side of the center surface, the extruded apertures allowing gases and flames from the heat source to pass through the collection plate, the extrusion portions directing food secretions onto the collection plate, the semicircular cross section guiding and collecting the secretions that fall onto the collection plate;

a cooking plate having a top side, a bottom side, and a center portion bounded by a periphery portion, the cooking plate having size and shape to substantially cover the mouth of a barbecue grill fire chamber, the periphery portion having structure sized and shaped to engage grate holding members of a barbecue grill;

a plurality of apertures through the center portion of the cooking plate; and a curved flange connected to the bottom side of the cooking plate encircling the center portion of the cooking plate, the curved flange directing gases released by the heat source back toward the heat source.

9. The apparatus of claim 8 further comprising:
a plurality of hanging members extending from the bottom side of the cooking plate; and
a plurality of hanging member receiving apertures through the collection plate, the collection plate suspended by the hanging members over the heat source.

10. The apparatus of claim 9 further comprising a fluid retention channel having a first and second fluid retention wall about the center surface of the collection plate, the fluid retention walls extending above the center surface of the collection plate and oppositely from the concave side of the center surface, the outer surface of the first retention wall retaining the secretions on the center surface of the collection plate.

11. The apparatus of claim 10 wherein the apertures through the cooking plate are larger than the extruded apertures in the collection plate.

12. The apparatus of claim 11 further comprising a back stop member connected to the top side of the cooking plate extending substantially perpendicular from the center portion.

13. The apparatus of claim 12 wherein the plurality of extruded apertures are circular and are from about ⅛ inch to about ⅜ inch in diameter.

14. A two stage fire control barbecue cooking apparatus, the apparatus comprising:
a collection plate of curved cross section having a convex side, a concave side, and a perimeter collecting secretions from food being cooked on a barbecue grill above the collection plate, the convex side of the collection plate directing the secretions toward the perimeter of the collection plate, the concave side of the collection plate directing gases being released by a heat source of the barbecue grill back toward the heat source suppressing the flames created by the heat source;

a plurality of apertures through the collection plate, the apertures having protruded edges extending oppositely from the concave side of the curved surface guiding at least half of the secretions onto the collection plate;

a cooking plate having a center portion bounded by a periphery portion, the periphery having structure sized and shaped to engage grate holding members of a barbecue grill;

a plurality of apertures through the center portion of the cooking plate; and a flange connected to the cooking plate encircling the center portion of the cooking plate, the flange configured to mate with the inner wall of a barbecue grill, the flange directing gases released by the heat source back toward the heat source suppressing flames created by the heat source.

15. The apparatus of claim 14 further comprising:

a plurality of hanging members extending from the cooking plate within the flange; and a plurality of hanging members receiving apertures through the collection plate, the collection plate suspended by the hanging members over the heat source.

16. The apparatus of claim 15 wherein the cross section of the flange is generally curved having a radius of from about 2 inches to about 4 inches.

17. The apparatus of claim 16 wherein the apertures through the cooking plate are larger than the apertures through the collection plate.

18. The apparatus of claim 17 further comprising a back stop member connected substantially perpendicular to the cooking plate.

19. The apparatus of claim 18 wherein the hanging members are capable of creating from about a 2 inch to about a 6 inch gap.

20. A method of controlling flames created in a barbecue grill, the method comprising:

collecting more than half of flammable fluids dropped toward a heat source of a barbecue grill during the cooking of food before the flammable fluids come into contact with the heat source;

allowing less than half of the flammable fluids to come into contact with the heat source of a barbecue grill creating flames and smoke;

creating a first chamber within the barbecue grill reducing the amount of air available to the heat source by redirecting an amount of the smoke toward the heat source;

allowing a portion of the flames and smoke to be released by the first chamber into a second chamber, the second chamber further reducing air available to the heat source by redirecting an amount of smoke within the second chamber.

21. An improved collection plate in combination with a charcoal fired barbecue grill, the combination comprising:

a bowl shaped fire chamber having a mouth defined by a lip;

a supporting structure holding the fire chamber;

at least one grate holding member adjacent the lip of the fire chamber;

a grate size and shaped to fit in the mouth of the fire chamber, the grate having at least one aperture for receiving the grate holding member;

a collection plate sized and shaped to fit within the fire chamber collecting secretions from food being cooked on the grate having a center portion of semicircular cross section having a concave side, a convex side and a curved lip portion about the center portion having a greater radius than the center portion, the convex side of the collection plate directing the secretions toward the perimeter of the collection plate, the concave side of the collection plate redirecting gases being released by a heat source in the bottom of the fire chamber back toward the heat source reducing the flames created by the heat source;

a plurality of apertures through the collection plate, the apertures having protruded edges extending above the collection plate and oppositely from the concave side guiding at least half of the secretions onto the collection plate;

a fluid retention channel having a first and second fluid retention wall about the center surface of the collection plate, the fluid retention walls extending above the collection plate and oppositely from the concave side of the center surface, the first fluid retention wall retaining the secretions on the center surface of the collection plate.

22. A two stage fire control barbecue cooking apparatus, the apparatus comprising:

a collection plate of curved cross section having a concave side sized and shaped to rest within walls of a barbecue grill collecting secretions from food being cooked on a barbecue grill above a heat source of a barbecue grill, the collection plate and walls of the barbecue grill forming a first chamber wherein the concave side of the collection plate facilitates the recirculation of smoke emitted from the heat source within the first chamber reducing the amount of oxygen therein;

a plurality of apertures through the collection plate, the apertures having protruded edges extending above the collection plate and oppositely from the concave side of the curved surface guiding a portion of the secretions onto the surface of the collection plate;

a cooking plate having a plurality of apertures in a center portion bounded by a periphery portion, the periphery of the cooking plate having structure sized and shaped to engage grate holding members of a barbecue grill; and a flange connected to the cooking plate encircling the center portion of the cooking plate, the flange configured to mate with the walls of the barbecue grill creating a second chamber wherein the flange facilitates the recirculation of smoke coming through the extruded apertures of the first chamber within the second chamber reducing the amount of oxygen therein.

23. A method of controlling flames created in a barbecue grill, the method comprising:

collecting flammable fluids dropped toward a heat source within a perimeter region of a barbecue grill during the cooking of food before the flammable fluids come into contact with the heat source;

allowing less than half of the flammable fluids to come into contact with the heat source of a barbecue grill creating flames and smoke;

creating a first chamber within the barbecue grill reducing the amount of air available to the heat source by redirecting an amount of the smoke toward the heat source;

allowing a portion of the flames and smoke to be released by the first chamber into a second chamber, the second chamber further reducing air available to the heat source by redirecting an amount of smoke within the second chamber.

* * * * *